(12) United States Patent
Skupin et al.

(10) Patent No.: US 12,313,749 B2
(45) Date of Patent: May 27, 2025

(54) METHOD FOR GNSS-BASED LOCALIZATION OF A VEHICLE

(71) Applicant: Robert Bosch GmbH, Stuttgart (DE)

(72) Inventors: Christian Skupin, Garbsen (DE); Wen Ren, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 200 days.

(21) Appl. No.: 17/806,555

(22) Filed: Jun. 13, 2022

(65) Prior Publication Data
US 2022/0404512 A1 Dec. 22, 2022

(30) Foreign Application Priority Data

Jun. 17, 2021 (DE) ...................... 10 2021 206 178.8

(51) Int. Cl.
| | | |
|---|---|---|
| *G01S 19/22* | (2010.01) | |
| *G01S 19/23* | (2010.01) | |
| *G01S 19/40* | (2010.01) | |
| *G01S 19/51* | (2010.01) | |
| G01S 19/07 | (2010.01) | |
| G01S 19/39 | (2010.01) | |
| G01S 19/42 | (2010.01) | |
| G01S 19/48 | (2010.01) | |

(52) U.S. Cl.
CPC .............. *G01S 19/22* (2013.01); *G01S 19/23* (2013.01); *G01S 19/40* (2013.01); *G01S 19/51* (2013.01); *G01S 19/07* (2013.01); *G01S 19/396* (2019.08); *G01S 19/42* (2013.01); *G01S 19/485* (2020.05)

(58) Field of Classification Search
CPC .......... G01S 19/22; G01S 19/42; G01S 19/51; G01S 19/396; G01S 19/485; G01S 19/07; G01S 19/23; G01S 19/40
USPC ............ 342/357.34, 357.44, 357.62, 357.23, 342/357.61, 357.25, 357.31, 357.22
See application file for complete search history.

(56) References Cited

U.S. PATENT DOCUMENTS

| | | | | |
|---|---|---|---|---|
| 9,080,866 | B1 * | 7/2015 | Dowdall | ................... G01C 3/08 |
| 9,360,328 | B2 * | 6/2016 | You | .......................... G01S 19/14 |
| 9,864,064 | B2 * | 1/2018 | Ishigami | ................. G01S 19/42 |
| 10,495,762 | B2 * | 12/2019 | Niesen | ............... G01C 21/3623 |
| 11,105,933 | B2 * | 8/2021 | Skupin | .................... G01S 19/40 |
| 11,169,274 | B2 * | 11/2021 | Viswanathan | .......... G01S 19/28 |
| 11,513,237 | B2 * | 11/2022 | Weisenburger | ....... G01S 19/485 |

(Continued)

*Primary Examiner* — Chuong P Nguyen
(74) *Attorney, Agent, or Firm* — Maginot, Moore & Beck LLP

(57) ABSTRACT

The disclosure relates to a method for GNSS-based localization of a vehicle, comprising at least the following steps: a) receiving GNSS-satellite signals from GNSS satellites and determining at least one item of distance information about the distance between the vehicle and the GNSS satellite emitting the relevant GNSS-satellite signal, b) determining at least one item of environmental information about the environment around the vehicle using image information determined using at least one environment sensor of the vehicle, which is capable of capturing images of at least part of the environment around the vehicle from different perspectives, c) determining at least one item of correction information using the at least one environmental information item, and d) correcting the at least one distance information item by means of the at least one correction information item.

10 Claims, 3 Drawing Sheets

(56) References Cited

U.S. PATENT DOCUMENTS

| | | | | |
|---|---|---|---|---|
| 11,619,745 B2* | 4/2023 | Luo | ............... | G01S 19/06 |
| | | | | 342/357.59 |
| 11,812,336 B2* | 11/2023 | Nirula | ............... | H04N 23/54 |
| 2015/0338522 A1* | 11/2015 | Miller | ............... | G01S 19/35 |
| | | | | 342/357.61 |
| 2018/0188382 A1* | 7/2018 | Jose | ............... | G01S 19/27 |
| 2019/0265365 A1* | 8/2019 | Skupin | ............... | G01S 19/49 |
| 2019/0272389 A1* | 9/2019 | Viente | ............... | G06V 20/588 |
| 2021/0063162 A1* | 3/2021 | Moskowitz | ............... | G01C 21/28 |
| 2022/0244407 A1* | 8/2022 | Skupin | ............... | G01S 19/14 |
| 2022/0276388 A1* | 9/2022 | Skupin | ............... | G01S 19/14 |
| 2023/0266480 A1* | 8/2023 | Tourian | ............... | G01S 19/20 |
| 2023/0375717 A1* | 11/2023 | Skupin | ............... | G01S 19/26 |

* cited by examiner

METHOD FOR GNSS-BASED LOCALIZATION OF A VEHICLE

This application claims priority under 35 U.S.C. § 119 to application No. DE 10 2021 206 178.8, filed on Jun. 17, 2021 in Germany, the disclosure of which is incorporated herein by reference in its entirety.

TECHNICAL FIELD

The disclosure relates to a method for the GNSS-based localization of a vehicle. In addition, a computer program for carrying out the method, a machine-readable storage medium, and a localization device for a vehicle are specified. The method can be used in particular in connection with at least partially autonomous or automated driving.

BACKGROUND

The provision of precise and reliable positioning by means of the GNSS system, among other techniques, contributes to enabling highly automated driving. However, in urban environments, especially in narrow street canyons, GNSS reception can be impaired. Here, satellite signals can be reflected at walls of buildings and thus arrive at the receiver with time offsets. As a rule, this means that the relevant pseudo-range is overestimated and thus the calculated position is subject to error. Two different cases of these so-called multipath effects can be distinguished, in particular. In the first case, the receiver retains a line of sight to the satellite (LOS) and receives both the direct satellite signal and the reflected signal. In the second case, the receiver does not have a line of sight to the satellite (NLOS), because the latter is blocked by a building, for example, and only the reflected signal is received. Since reflected signals usually exhibit attenuated amplitudes and/or delayed propagation times, in the LOS case they can be distinguished from the directly received satellite signals and the error can be compensated (to a certain extent) by a suitable correlation in the receiver. The multipath effect caused in the NLOS case, on the other hand, is usually more difficult to detect and can therefore lead to a much larger positioning error.

Against this background, the disclosure aims to improve the compensation or correction of multipath effects, in particular in the NLOS case.

SUMMARY

A method for GNSS-based localization of a vehicle position is proposed, comprising at least the following steps:
a) receiving GNSS-satellite signals from GNSS satellites and determining at least one item of distance information about the distance between the vehicle and the GNSS satellite emitting the relevant GNSS-satellite signal,
b) determining at least one item of environmental information about the environment around the vehicle using image information determined using at least one environment sensor of the vehicle, which is capable of capturing images of at least part of the environment around the vehicle from different perspectives,
c) determining at least one item of correction information using the at least one environmental information item,
d) correcting the at least one distance information item by means of the at least one correction information item.

In this context, GNSS stands for Global Navigation Satellite System, for example GPS (Global Positioning System) or Galileo. The sequence of steps a), b), c) and d) is only exemplary and can thus occur during a normal operating sequence of the method, or at least once in the sequence indicated. In addition, at least the steps a) and b) can also be carried out at least partially in parallel or simultaneously. The method can be carried out, for example, by means of a vehicle localization device (also described here).

Using the method described here, the erroneous pseudo-range of reflected GNSS-satellite signals from GNSS satellites to which no direct line of sight exists (NLOS satellites) can be advantageously corrected by means of an additional value which is determined using one or more cameras. The use of a so-called structure-from-motion method for evaluating the captured image information is particularly advantageous in this context. The vehicle can be a motor vehicle, such as an automobile. Furthermore, the vehicle can be configured for at least partially automated and/or autonomous driving operation.

In step a) GNSS-satellite signals are received from GNSS satellites and at least one item of distance information is determined about the distance between the vehicle and the GNSS satellite emitting the relevant GNSS-satellite signal. The reception can be effected via at least one GNSS antenna of the vehicle, which can transmit the received signal in raw or pre-processed form to a localization device of the vehicle. The at least one distance information item can be determined by measuring the signal propagation time. Where appropriate, in addition to the actual distance between the vehicle and the GNSS satellite, the distance information can also include a component attributable to at least one reflection of the relevant GNSS-satellite signal. In other words, the distance information can relate to or describe a pseudo-range that is too long and/or has not yet been corrected.

In step b) at least one item of environmental information about the environment around the vehicle is determined by using image information determined using at least one environment sensor of the vehicle, which is capable of capturing images of at least part of the environment around the vehicle from different perspectives. For example, the at least one environment sensor can comprise at least one optical sensor and/or at least one acoustic sensor. For example, the at least one environment sensor can comprise at least one camera, a radar sensor, lidar sensor, ultrasonic sensor, or the like. Preferably, the at least one environment sensor comprises at least one camera. For example, the at least one environment sensor can be arranged on the vehicle such that it can be moved (in a controlled manner) in order to be able to capture at least part of the environment from different perspectives. Preferably, the at least one environment sensor can be mounted on the vehicle in such a way (including, if applicable, fixedly) that it can capture at least part of the environment from different perspectives due to the vehicle's movement relative to the environment. Furthermore, at least two environment sensors can be present and arranged on the vehicle and/or aligned relative to each other in such a way that overall they can capture at least part of the environment from different perspectives.

In step c), at least one item of correction information is determined using the at least one environment information item. The environment information can describe, for example, a spatial distance to an object such as a building or building wall in the vicinity of the vehicle. In this context, more than one, e.g. at least two, spatial distances to two objects, such as (oppositely positioned) buildings or building walls in the vicinity of the vehicle, can also be used to determine the correction information. The correction information can be provided, for example, in the form of a scaling factor or a correction value. The correction value can preferably describe an overestimated distance.

In step d) the at least one distance information item is corrected by means of the at least one correction information item. For example, to obtain the actual distance between the vehicle and the GNSS satellite transmitting the relevant GNSS signal, the distance information can be scaled or reduced by the correction value.

According to an advantageous embodiment, it is proposed that a test is additionally carried out as to whether one or more of the GNSS-satellite signals are reflected GNSS-satellite signals from GNSS satellites to which no direct line of sight exists (NLOS satellites). In this context, for example, reflected satellite signals can be detected at a low carrier-to-noise ratio (C/NO) and/or a significant pseudo-range residual. In particular in the case of a moving vehicle, these values can also be observed over time. For example, jumps in the C/NO and/or residuals (e.g. C/NO becomes smaller, residual becomes larger) can allow inferences to be drawn about reflected signals. Alternatively, or in addition, GNSS satellites that do not have a direct line of sight can be identified using at least one of the vehicle's cameras. For this purpose, surrounding buildings can be detected in the camera images by means of an image processing method, such as semantic segmentation. Using known azimuth and elevation angles of the satellites, for example, a kind of ray tracing can be performed to detect whether a direct line of sight to the corresponding satellite is available. A ray tracing technique can be advantageously used to perform the calculation of reflections. In this case, it may be sufficient to check whether the direct path exists, in particular without even calculating the reflections. This is advantageously possible with very little computing effort.

According to a further advantageous embodiment, it is proposed that the environment sensor comprises at least one camera. For example, the environment sensor can comprise two or more cameras. The cameras can be arranged on the vehicle and/or aligned relative to each other in such a way that overall they can capture at least part of the environment from different perspectives. The environment sensor particularly preferably comprises a panoramic camera system.

According to a further advantageous embodiment, it is proposed that the at least one environmental information item is determined using a structure-from-motion method. Structure from Motion (SFM) usually refers to a method of obtaining 3D information by overlapping time-shifted images, in particular using the so-called parallax. A particular advantage of the structure-from-motion method can be seen in the fact that, unlike conventional photogrammetry, no target objects for which the 3D position is known need to be specified beforehand. In other words, structure-from-motion describes a method of 3D surface calculation with 2D image information from different perspectives. For example, the distance to pixels and/or objects can be determined by observing them with a camera from different angles at staggered times. A vehicle equipped with one or more cameras is thus advantageously able to determine the distance to surrounding objects, in particular buildings. By means of a camera system with panoramic vision, this method even advantageously allows a 3D model of the environment to be created. This model can contribute in a particularly advantageous way to determining at least one environment information item and/or at least one correction information item.

According to a further advantageous embodiment, it is proposed that the at least one environment information item comprises at least one spatial distance to an object in the area around the vehicle. For example, the spatial distance can refer to a horizontal distance. The object can be, for example, a building or a building wall.

According to a further advantageous embodiment, it is proposed that the at least one correction information item describes a measure for a component of the distance information which is attributable to at least one reflection of the relevant GNSS-satellite signal. In other words, this can also be designated in particular as a so-called overestimated distance.

According to a particularly advantageous embodiment, the method comprises performing a GNSS pseudo-range correction by using a structure-from-motion method. The method can thus provide a particularly advantageous approach for highly automated driving that will advantageously increase the accuracy of GNSS-based localization in urban environments. In this context, the pseudo-range of reflected satellite signals measured from the receiver to the satellite can be corrected by an additional value which is determined using cameras and the structure-from-motion 3D reconstruction method.

According to a further aspect, a computer program for carrying out a method presented here is also proposed. In other words, this relates in particular to a computer program (product), comprising commands which during the execution of the program by a computer, cause it to execute a method described here.

According to a further aspect, a machine-readable data medium is also proposed, on which the computer program is stored. Typically, the machine-readable storage medium is a computer-readable data carrier.

According to a further aspect, a localization device for a vehicle is specified, which is configured to carry out a method described here. In other words, this relates to a vehicle localization device that is configured to carry out a method described here. For example, the previously described storage medium can form an integral part of the localization device or be connected thereto. The localization device is preferably arranged in or on a (motor) vehicle or is provided and configured for assembly in or on the same. Preferably, the localization device forms a GNSS sensor or comprises at least one such sensor. The localization device may additionally be preferably designed and configured for an autonomous operation of the vehicle. The localization device can also be a combined motion and position sensor. Such a device is particularly advantageous for autonomous vehicles. The localization device or a processing unit (processor) of the localization device can access, for example, the computer program described here in order to execute a method described here.

The details, features and advantageous designs discussed in connection with the method may also occur accordingly in the computer program and/or storage medium and/or localization device presented here, and vice versa. In this respect reference is made to the comments made there for further characterization of the features in their full extent.

BRIEF DESCRIPTION OF THE DRAWINGS

The solution presented here as well as its technical background will be explained in more detail below on the basis of the figures. It should be noted that the disclosure is not intended to be limited by the exemplary embodiments. In particular, unless explicitly indicated otherwise, it is also possible to extract partial aspects of the facts explained in the figures and to combine them with other components and/or information from other figures and/or the present description. In the schematic and exemplary drawings.

DETAILED DESCRIPTION

Figure 1:
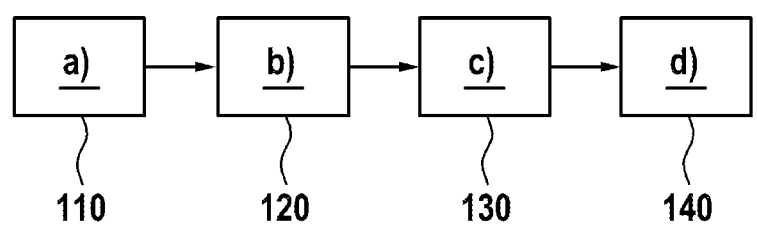
FIG. 1: shows a flowchart of the method described here.

FIG. 1 shows a schematic and exemplary flowchart of the method described here. The method is used for GNSS-based localization of a vehicle 1 (cf. FIG. 2). The sequence of steps a), b) and c) shown by the blocks 110, 120 and 130 is exemplary and can thus be used in a normal operating sequence.

In block 110, according to step a), GNSS-satellite signals 2 are received from GNSS satellites 3 and at least one item of distance information is obtained about the distance 4 between the vehicle 1 and the GNSS satellite 3 transmitting the relevant GNSS satellite signal 2. In block 120, according to step b) at least one item of environmental information about the environment around the vehicle 1 is determined by using image information determined using at least one environment sensor 5 of the vehicle 1, which is capable of capturing images of at least part of the environment around the vehicle 1 from different perspectives. In block 130, according to step c), at least one item of correction information is determined using the at least one environment information item. In block 140, according to step d) the at least one distance information item is corrected by means of the at least one correction information item.

The global navigation satellite system, or GNSS, is a system for positioning and navigation. GNSS is a collective term for various satellite systems, including NAVSTAR GPS, GLONASS, Galileo and Beidou. To determine position, the satellites communicate their exact position (elevation and azimuth) and clock time via radio codes. In the receiver, the pseudo-ranges are obtained, i.e. the distances between satellite and receiver, determined from the signal propagation times inclusive of clock errors between satellite and receiver. If four or more satellites receive at the same time, the clock error can be compensated and the current position of the receiver determined.

The at least one environment sensor 5 can comprise at least one camera. In addition, the at least one item of environment information can be determined using a so-called structure-from-motion method. It is thus possible to specify a particularly advantageous approach for preferably highly automated driving that will advantageously increase the accuracy of GNSS-based localization in urban environments. The pseudo-range of reflected satellite signals measured from the receiver to the satellite can advantageously be corrected by an additional value which is determined using the at least one camera and the structure-from-motion 3D reconstruction method.

Figure 2:
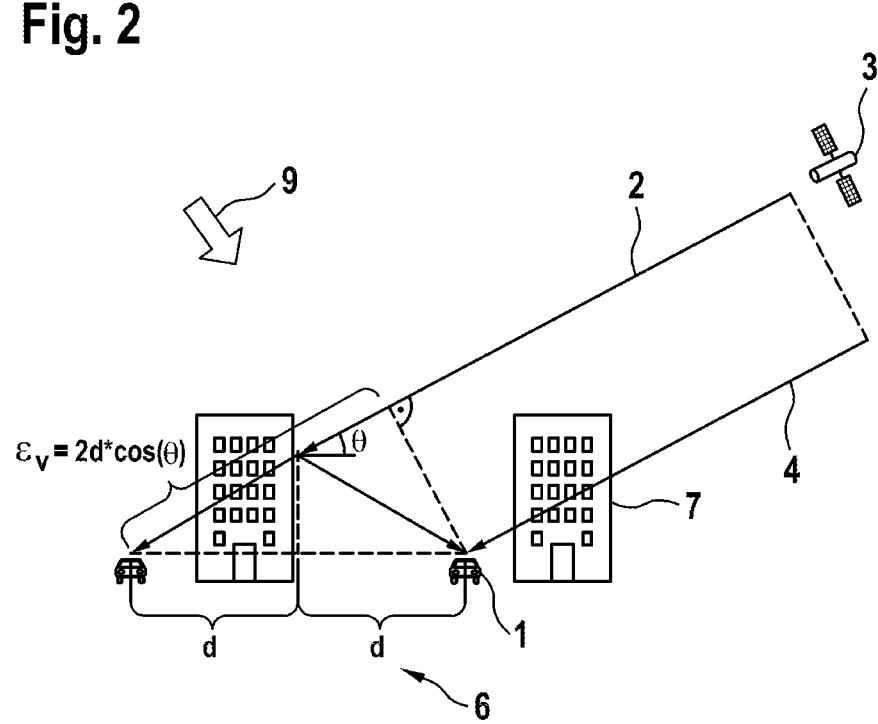
FIG. 2: shows one possible application of the described method, viewed in the direction of a street canyon.

FIG. 2 shows a schematic and exemplary drawing of a possible application of the described method, viewed in the direction of a street canyon. The street canyon is illustrated here in an exemplary way by two objects 7 in the form of buildings or high-rise buildings.

In the method a test can (firstly) be carried out as to whether one or more of the GNSS-satellite signals 2 are reflected GNSS-satellite signals 2 from GNSS satellites 3 to which no direct line of sight exists. In other words, this can also be described in particular by stating that a decision is (firstly) made as to which pseudo-ranges the correction will be applied to. In particular, it is checked which of the received satellite signal or signals is/are actually reflected signals from satellites to which there is no direct line of sight. In principle, different approaches can be applied to this problem. For example, reflected satellite signals can be detected at a low carrier-to-noise ratio (C/NO) and/or a significant pseudo-range residual. In particular in the case of a moving vehicle, these values can also be observed over time. Thus, jumps in the C/NO and/or residuals (e.g. C/NO becomes smaller, residual becomes larger) can also indicate newly reflected signals.

Alternatively or in addition, NLOS satellites (i.e. GNSS satellites to which there is no direct line of sight) can also be identified (directly) by means of cameras (on the vehicle). For this purpose, surrounding buildings can be detected in the camera images, for example using the image processing method of semantic segmentation. Using known azimuth and elevation angles of the satellites, for example, ray tracing can be performed to detect whether a direct line of sight to the corresponding satellite is available.

In particular if the NLOS satellites with pseudo-ranges to be corrected are known, the overestimated distance (due to the reflection) can be advantageously calculated as a correction value in a following step. For this purpose, FIG. 2 shows an example of a section perpendicular to the direction of a street canyon. Here, the vehicle 1 receives a reflected signal 2 of an NLOS satellite 3, which is under the elevation angle θ. Due to the reflection, the position of the vehicle 1 is wrongly assumed to be on the left-hand side of the building 7 shown on the left in FIG. 2.

Here, $\varepsilon_v$ is the overestimated distance of the pseudo-range. Due to the right-angled triangle, this value can be calculated to $\varepsilon_v = 2d*\cos(\theta)$, with d being the unknown distance to the building wall. If, for example, the vehicle 1 is equipped with cameras as environment sensors 5 which detect the building wall, this distance can be determined in a particularly advantageous way using the structure-from-motion 3D reconstruction method. For this purpose, pixels and/or objects from the moving vehicle 1 are viewed from different angles with time offsets. The distance d to the objects 7, in this case to the building wall, can then be determined using triangulation.

In this context, the distance d is an example of the fact that, and possibly how, the at least one environmental information item can comprise at least one spatial distance 6 to an object 7 in the vicinity of the vehicle 1. Furthermore, the overestimated distance $\varepsilon_v$ of the pseudo-range is an example of the fact that, and possibly how, the at least one correction information item (here, for example, $\varepsilon_v$) describes a measure for a component of the distance information (here pseudo-range) that can be attributed to at least one reflection of the relevant (NLOS) GNSS-satellite signal 2.

Figure 3:
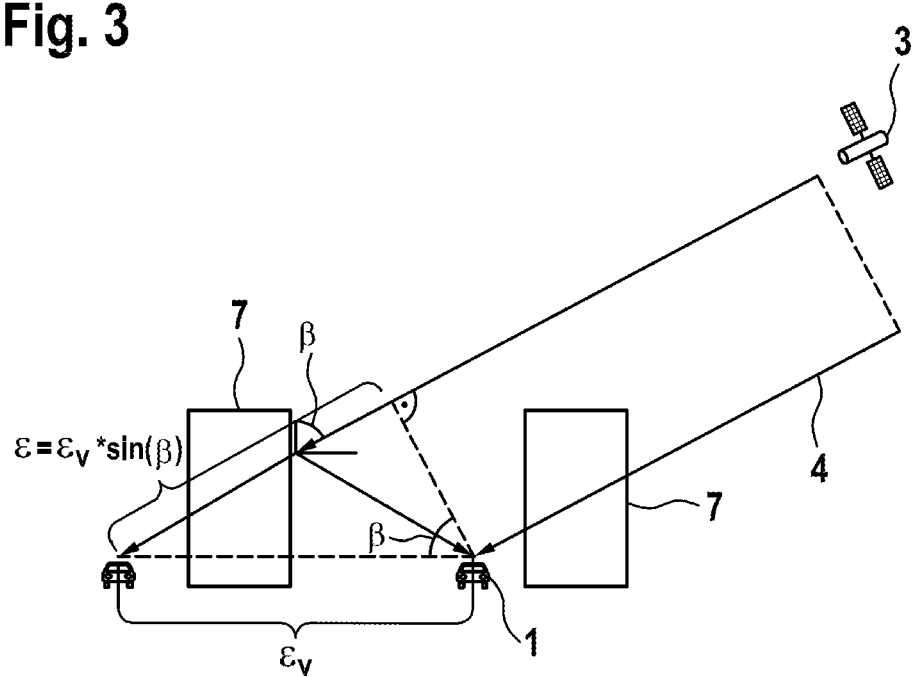
FIG. 3: shows the possible application from FIG. 2 with a view of the street canyon.

FIG. 3 shows a schematic and exemplary drawing of the possible application of FIG. 2, with a view of the street canyon. The illustration according to FIG. 3 explains an example of how the correction value $\varepsilon_v$ explained in connection with FIG. 2, in particular for the 2-dimensional case, can be supplemented by the missing component for the 3-dimensional case. For this purpose, in FIG. 3 the situation is considered from a perspective which is indicated in FIG. 2 by the arrow 9 at the top left (plan view of a plane inclined with the elevation angle θ through the satellite signal 2). Here also, the (new) correction value ε can be calculated by means of a right-angled triangle, this time with the already determined value $\varepsilon_v$ as the hypotenuse. For the 3-dimensional case, the final correction value evaluates to $\varepsilon=\varepsilon_v*|\sin(\beta)|=2d*\cos(\theta)*|\sin(\beta)|$. The angle $\theta$ here is the difference between the azimuth angle of the satellite 3 and the direction of the street canyon. The correction value for $\varepsilon$ thus determined represents a particularly preferred correction information item in the sense of the method described here, which is determined by means of the captured environment information d (spatial distance 6).

Finally, in order to obtain the new pseudo-range (actual distance 4 between the vehicle 1 and the GNSS satellite 3), here the correction value $\varepsilon$ is subtracted from the originally measured pseudo-range (distance information from step a)). This is an example of the correction of the at least one distance information item by means of the at least one correction information item.

Figure 4:
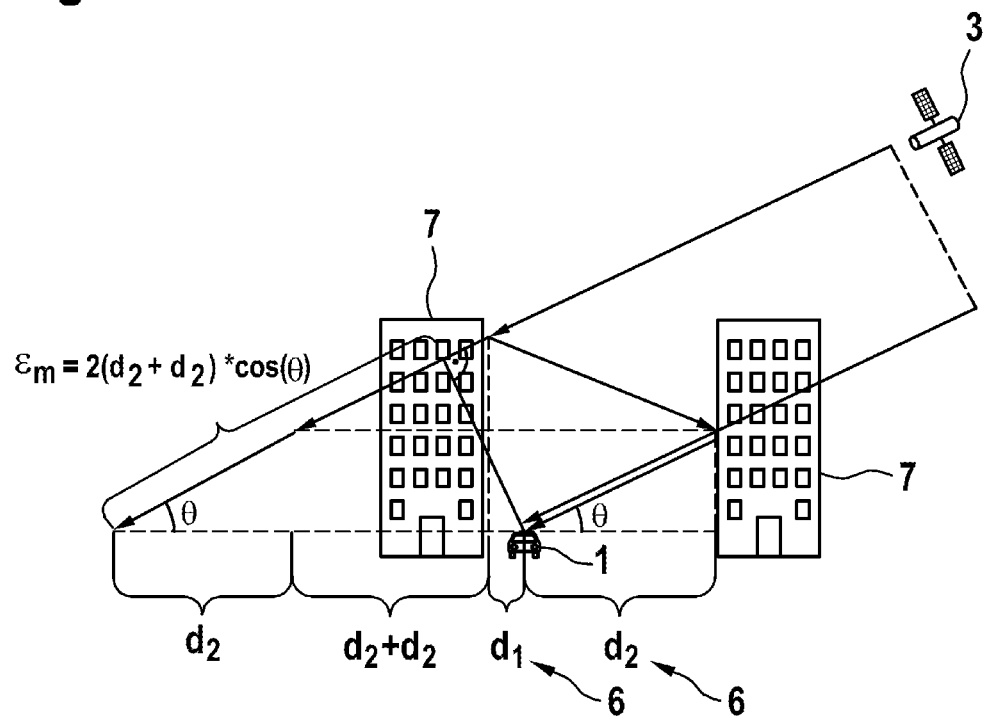
FIG. 4: shows a possible application of the described method with multiple reflections.

FIG. 4 shows a schematic and exemplary drawing of a possible application of the described method in the case of multiple reflection. In other words, FIG. 4 illustrates that, and possibly how, the described method can also be advantageously used for the correction of multiple reflections. For example, in the case of a double reflection, for example, the error based on the distance $d_2$ to the building 7 at which the second reflection occurs (here the building 7 shown on the right) can also be taken into account.

The correction value therefore evaluates advantageously to $\varepsilon_m=\varepsilon_1+\varepsilon_2=2d_1*\cos(\theta)*|\sin(\beta)|+2d_2*\cos(\theta)*|\sin(\beta)|=2(d_1+d_2)*\cos(\theta)*|\sin(\beta)|$, where $\varepsilon_1$ denotes the correction value associated with the first reflection, $\varepsilon_2$ the correction value associated with the second reflection, $d_1$ the distance to the building wall associated with the first reflection, and $d_2$ the distance to the building wall associated with the second reflection. The correction value for $\varepsilon_m$ thus determined represents a particularly preferred correction information item in the sense of the method described here, which is determined by means of the captured environment information $d_1$ and $d_2$ (spatial distances 6).

To identify the presence of a double reflection, surrounding building heights can (also) be determined in an advantageous way by structure-from-motion. A double reflection is identified in particular when the building wall associated with the first reflection is higher than $h_{min,1}=(d_1+2d_2)*\tan(\theta)/\sin(\beta)$ and (simultaneously) the height $h_2$ of the building wall associated with the second reflection has a minimum height of $h_{min,2}=d_2*\tan(\theta)/|\sin(\beta)|$ and a maximum height of $h_{max,2}=(2d_1+3d_2)*\tan(\theta)/|\sin(\beta)|$ (or $h_{min,2}<h_2<h_{max,2}$).

However, double or multiple reflections do not necessarily need to be corrected in this way (i.e. with the correction value $\varepsilon_m$). This is because even with the more general procedure described here for correcting single reflections, improvements in the pseudo-range and thus also in the positional accuracy can already be achieved.

Figure 5:
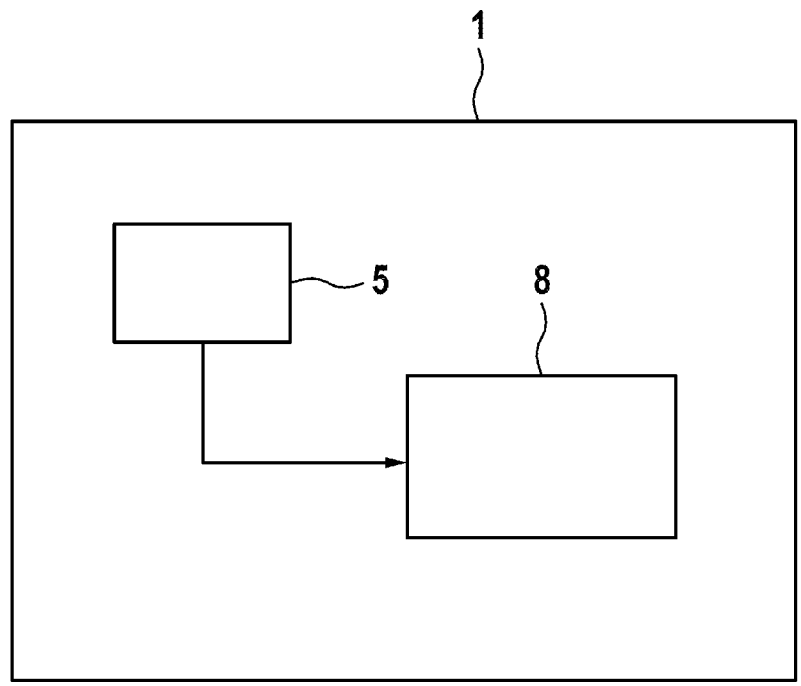
FIG. 5: shows a vehicle with a localization device as described here.

FIG. 5 shows a schematic and exemplary drawing of a vehicle 1 having a localization device 8 described here. The localization device 8 is configured to carry out the method described here. The localization device 8 can obtain data from an environment sensor 5 of the vehicle 1.

The described method allows the compensation or correction of multipath effects to be improved in an advantageous way, in particular in the NLOS case.

What is claimed is:

1. A method for GNSS-based localization of a vehicle, the method comprising:
   receiving GNSS satellite signals from GNSS satellites and determining at least one distance information item about a distance between the vehicle and a GNSS satellite of the GNSS satellites that emits a respective GNSS satellite signal of the GNSS satellite signals;
   determining at least one environmental information item about an environment around the vehicle using image information determined using at least one environment sensor of the vehicle that is configured to capture images of at least part of the environment around the vehicle from different perspectives;
   determining at least one correction information item using the at least one environmental information item;
   correcting the at least one distance information item using the at least one correction information item; and
   carrying out a test to determine whether at least one of the received GNSS satellite signals are reflected GNSS satellite signals of the GNSS satellites to which no direct line of sight exists by (i) detecting surrounding buildings in the captured images, (ii) determining azimuth and elevation angles of the GNSS satellites, and (iii) performing ray tracing based on the detected surrounding buildings and the determined azimuth and elevation angles to identify when the GNSS satellite signals are received from one of the GNSS satellites with a direct line of sight and when the GNSS satellite signals are received from one of the GNSS satellites to which there is no direct line of sight.

2. The method according to claim 1, wherein the at least one environment sensor includes at least one camera.

3. The method according to claim 1, the determining at least one environmental information item further comprising:
   determining the at least one environmental information item using a structure-from-motion method.

4. The method according to claim 1, wherein the at least one environment information item includes at least one spatial distance to an object in the environment around the vehicle.

5. The method according to claim 1, wherein the at least one correction information item describes a measure for a component of the at least one distance information item that is attributable to at least one reflection of the respective GNSS satellite signal.

6. The method according to claim 1, wherein the method is carried out by a computer program.

7. The method according to claim 1, further comprising:
   moving the at least one environment sensor in order to capture the images from the different perspectives.

8. The method according to claim 1, wherein:
   the at least one environment sensor includes a first environment sensor and a second environment sensor,
   the first environment sensors is arranged on the vehicle to capture images of at least the part of the environment from a first perspective, and
   the second environment sensors is arranged on the vehicle to capture images of at least the part of the environment from a second perspective that is different from the first perspective.

9. A non-transitory machine-readable storage medium that stores a computer program for GNSS-based localization of a vehicle, the computer program, when executed by a computer, causing the computer to:
   receive GNSS satellite signals from GNSS satellites and determine at least one distance information item about a distance between the vehicle and a GNSS satellite of the GNSS satellites that emits a respective GNSS satellite signal of the GNSS satellite signals;
   determine at least one environmental information item about an environment around the vehicle using image information determined using at least one environment sensor of the vehicle that is configured to capture images of at least part of the environment around the vehicle from different perspectives;

determine at least one correction information item using the at least one environmental information item;

correct the at least one distance information item using the at least one correction information item; and carrying out a test to determine whether at least one of the received GNSS satellite signals are reflected GNSS satellite signals of the GNSS satellites to which no direct line of sight exists by (i) detecting surrounding buildings in the captured images, (ii) determining azimuth and elevation angles of the GNSS satellites, and (iii) performing ray tracing based on the detected surrounding buildings and the determined azimuth and elevation angles to identify when the GNSS satellite signals are received from one of the GNSS satellites with a direct line of sight and when the GNSS satellite signals are received from one of the GNSS satellites to which there is no direct line of sight.

10. A localization device for a vehicle, the localization device being configured to:

receive GNSS satellite signals from GNSS satellites and determine at least one distance information item about a distance between the vehicle and a GNSS satellite of the GNSS satellites that emits a respective GNSS satellite signal of the GNSS satellite signals;

determine at least one environmental information item about an environment around the vehicle using image information determined using at least one environment sensor of the vehicle that is configured to capture images of at least part of the environment around the vehicle from different perspectives;

determine at least one correction information item using the at least one environmental information item;

correct the at least one distance information item using the at least one correction information item; and carrying out a test to determine whether at least one of the received GNSS satellite signals are reflected GNSS satellite signals of the GNSS satellites to which no direct line of sight exists by (i) detecting surrounding buildings in the captured images, (ii) determining azimuth and elevation angles of the GNSS satellites, and (iii) performing ray tracing based on the detected surrounding buildings and the determined azimuth and elevation angles to identify when the GNSS satellite signals are received from one of the GNSS satellites with a direct line of sight and when the GNSS satellite signals are received from one of the GNSS satellites to which there is no direct line of sight.

* * * * *